(12) United States Patent
Burke

(10) Patent No.: US 6,353,508 B1
(45) Date of Patent: Mar. 5, 2002

(54) POLARIZING FRESNEL ENHANCED APPARENT DEPTH VIEWING SCREENS AND SYSTEMS

(76) Inventor: Douglas Burke, P.O. Box 4254, Balboa, CA (US) 92661

( * ) Notice: Subject to any disclaimer, the term of this patent is extended or adjusted under 35 U.S.C. 154(b) by 0 days.

(21) Appl. No.: 09/479,394

(22) Filed: Jan. 6, 2000

(51) Int. Cl.[7] .......................... G02B 3/08; G03B 21/60; G03B 21/00; H04N 13/00
(52) U.S. Cl. ........................ 359/742; 359/456; 359/457; 359/458; 353/10; 348/44
(58) Field of Search ................. 359/456, 457, 359/478, 742, 626; 353/10; 352/86; 348/44

(56) References Cited

U.S. PATENT DOCUMENTS

| | | | |
|---|---|---|---|
| 2,341,982 A | | 2/1944 | Dillehay .................. 442/297 |
| 2,997,390 A | | 8/1961 | Land ........................ 430/213 |
| 3,248,165 A | | 4/1966 | Marks et al. .............. 352/58 |
| 3,709,580 A | | 1/1973 | Fugitt et al. ............. 359/493 |
| 3,712,707 A | * | 1/1973 | Henkes, Jr. .............. 359/458 |
| 4,140,370 A | * | 2/1979 | Snaper et al. ............ 359/458 |
| 4,268,127 A | | 5/1981 | Oshima et al. ........... 349/96 |
| 4,361,382 A | * | 11/1982 | Miyoshi et al. ........... 359/453 |
| 4,577,928 A | * | 3/1986 | Brown ...................... 359/497 |
| 4,936,658 A | | 6/1990 | Tanaka et al. ............ 349/9 |
| 5,193,015 A | | 3/1993 | Shanks ..................... 349/115 |
| 5,299,289 A | | 3/1994 | Omae et al. .............. 349/201 |
| 5,347,644 A | | 9/1994 | Sadlmayr .................. 359/465 |
| 5,469,295 A | * | 11/1995 | Burke ....................... 359/478 |
| 5,650,872 A | | 7/1997 | Saxe et al. ................ 359/296 |
| 5,669,690 A | | 9/1997 | Hodson et al. ........... 353/122 |
| 5,686,979 A | | 11/1997 | Weber et al. ............. 349/96 |
| 5,691,843 A | * | 11/1997 | O'Neill ..................... 359/464 |
| 5,694,245 A | | 12/1997 | Goto et al. ................ 359/460 |
| 5,716,122 A | | 2/1998 | Esaki et al. ............... 353/33 |
| 5,760,954 A | | 6/1998 | Tatsuki et al. ............ 359/452 |
| 6,064,521 A | * | 5/2000 | Burke ....................... 359/443 |
| 6,106,983 A | * | 8/2000 | Burke ....................... 430/17 |

* cited by examiner

*Primary Examiner*—Georgia Epps
*Assistant Examiner*—David N. Spector
(74) *Attorney, Agent, or Firm*—Douglas Burke

(57) ABSTRACT

A novel system and method for viewing optical images with enhanced apparent depth is disclosed. The present invention utilizes the combined effects of a polarizing layer and a magnifying layer to achieve the enhanced apparent depth of the images being viewed. In a preferred embodiment, a polarizing layer is used in combination with a Fresnel layer having concentric circles to enhance the apparent depth of the images being viewed.

34 Claims, 10 Drawing Sheets

POLARIZING FRESNEL ENHANCED APPARENT DEPTH VIEWING SCREENS AND SYSTEMS

FIELD OF THE INVENTION

This invention relates to methods and systems of displaying and/or viewing optical images with enhanced apparent depth.

BACKGROUND OF THE INVENTION

Human beings have the ability to perceive depth, and various attempts have been made to reproduce the 3-D effects on the 2-D media.

For example, various prior art techniques and apparatus have been heretofore proposed to present three dimensional images on a viewing screen using a stereographic technique such as on a polarization conserving motion picture screen. See U.S. Pat. No. 4,955,718 to Jachimowicz, et al., U.S. Pat. No. 4,963,959 to Drew, U.S. Pat. No. 4,962,422 to Ohtomo, et al., U.S. Pat. No. 4,959,641 to Bess, et al., U.S. Pat. No. 4,957,351 to Shioji, U.S. Pat. No. 4,954,890 to Park, U.S. Pat. No. 4,945,408 to Medina, U.S. Pat. No. 4,936,658 to Tanaka, et al., U.S. Pat. No. 4,933,755 to Dahl, U.S. Pat. No. 4,922,336 to Morton, U.S. Pat. No. 4,907,860 to Noble, U.S. Pat. No. 4,877,307 to Kalmanash, U.S. Pat. No. 4,872,750 to Morishita, U.S. Pat. No. 4,853,764 to Sutter, U.S. Pat. No. 4,851,901 to Iwasaki, U.S. Pat. No. 4,834,473 to Keyes, et al., U.S. Pat. No. 4,807,024 to McLaurin, et al., U.S. Pat. No. 4,799,763 to Davis, U.S. Pat. No. 4,772,943 to Nakagawa, U.S. Pat. No. 4,736,246 to Nishikawa, U.S. Pat. No. 4,649,425 to Pund, U.S. Pat. No. 4,641,178 to Street, U.S. Pat. No. 4,541,007 to Nagata, U.S. Pat. No. 4,523,226 to Lipton, et al., U.S. Pat. No. 4,376,950 to Brown, et al., U.S. Pat. No. 4,323,920 to Collendar, U.S. Pat. No. 4,295,153 to Gibson, U.S. Pat. No. 4,151,549 to Pautzc, U.S. Pat. No. 3,697,675 to Beard, et al. These techniques and apparatus involve the display of polarized or color sequential two-dimensional images which contain corresponding right eye and left eye perspective views of three dimensional objects. These separate images can also be displayed simultaneously in different polarizations or colors. Suitable eyewear, such as glasses having different polarizing or color separations coatings permit the separate images to be seen by one or the other eye. This type of system is expensive and cumbersome because it requires collecting the image from two different views which demands a special camera or two cameras. U.S. Pat. No. 4,954,890 to Park discloses a representative projector system employing the technique of alternating polarization.

Another technique involves a timed sequence in which images corresponding to right-eye and left-eye perspectives are presented in timed sequence with the use of electronic light valves. U.S. Pat. No. 4,970,486 to Nakagawa, et al., and U.S. Pat. No. 4,877,307 to Kalmanash disclose representative prior art of this type. This time sequence technique also requires the use of eyewear.

Yet, another example of the timed sequence technique in which the left and right eye views have different polarizations and are viewed not with glasses but with a single polarized screen over both eyes. The screen is formed of a transparent material that has two or more different polarization coatings. U.S. Pat. No. 5,347,644 to Sedlmayr discloses representative prior art of this type. The timed sequence also requires collecting the image from different views, right eye and left eye.

Alternating polarization and timed sequence stereoscopic techniques both possess the following disadvantages; the image cannot be collected or displayed with convention single view equipment, and eyewear is required for viewing.

U.S. Pat. No. 5,543,964 to Taylor et al. is another example of superimposing images to create an illusion of depth based on the stereo nature of human vision. The proposed invention creates depth using a single image and is not based on binocular vision. Another superimposition technique is shown in U.S. Pat. No. 5,556,184 to Nader-Esfahani. Again the proposed invention is not based on superimposition of images. U.S. Pat. No. 5,589,980 to Bass displays images in apparent three dimensions using two display devices, one being in front of the other creating apparent depth. The proposed invention displays images in apparent three dimensions using a single screen instead of two.

U.S. Pat. No. 5,559,632 to Lawrence et al. introduces special glasses for viewing regular images in apparent three dimensions employing stereoscopic theory. The proposed invention is not based on stereoscopic theory, and does not require eyewear. It is known that holographic techniques have been used for three dimensional information recording and display. These techniques involve illuminating a three dimensional object with a coherent (laser) beam of light and interfering that light with a reference beam from the same source. The interference pattern is collected on a recording film medium and illumined with the same coherent light from which it was made. The result is a projected image of the object in three dimensions able to be viewed without eyewear. Holographic techniques are not in general use because inherent in them are many limitations: an object has its dimension limited to an extent that it can be illuminated by a laser beam; the object should be stationary; a photograph thereof must be taken in a dark room; and the image cannot be collected and displayed in real time.

Some of the limitations of holography have been addressed by a technique known as composite holography. Composite holography consists of photographing a three dimensional object in a plurality of different directions under usual illumination such as natural light to prepare a plurality of photographic film sections on which two-dimensional pictorial information is recorded. These two dimensional photographs are information images and are separately illumined with coherent (laser) light and are recorded as holograms. These holograms are then simultaneously illumined with coherent (laser) light producing a projection of the perspective information of the three-dimensional object to be recognized by unaided human eyes at different angles depending upon their position with as much effect as one substantially views the image of the three dimensional object. Composite holography was limited since the size of the recording medium of the holograms had to be large leading to a large sized overall device making it economically impractical. That limitation was resolved by Takeda et al. as disclosed in U.S. Pat. No. 4,037,919. Also in that disclosure is a detailed description of composite holography. The disadvantage of composite holography is that it involves photographing the object from many different angles and making a hologram of each of those photographic images. This makes it impossible to collect and display the three dimensional image in real time. A further disadvantage is that it is time consuming, laborious and expensive.

Thus, there is a great need for a system and method for viewing images in enhanced apparent depth, while avoiding the shortcomings and drawbacks of prior art apparatus and methodologies.

OBJECT OF THE PRESENT INVENTION

Accordingly, it is a primary object of the present invention to provide a novel method and apparatus for viewing images in enhanced apparent depth while overcoming the shortcomings and drawbacks associated with prior art apparatus and methodologies.

A further object of the present invention is to provide a method and system for enhancing the depth of an image by presenting it on a specialized screen system.

A further object of the present invention is to provide a screen system that can be placed over a television or computer display and enhance the apparent depth without the use of eyewear.

A further object of the present invention is to provide a method and system for enhancing the depth of an optical image that has been recorded on conventional film or video with white light unlike holography where the image must be recorded with laser light.

Still further object of the present invention is to provide a method and system for viewing any television/video or movie with enhanced depth without adding stereoscopic information to the film or the film or the television/video signal. create passive eyewear that can be used to watch any television/video or movie.

Yet, still further object of the present invention is to provide a passive eyewear for viewing any television/video or movie with enhanced depth without adding stereoscopic information to the film or the film or the television/video signal.

Other objects of the present invention will become apparent hereinafter and in the claims to invention.

THEORY OF THE INVENTION

Light can be represented as electromagnetic fields which vary sinusoidally and orthogonally to the direction of propagation. For the purposes of the present invention, it is only the electric field component of the wave which will interact with matter and produce relevant phenomena. An electric field is simply the force per unit electric charge in a region of space. Equivalently, if an electric charge were in a region of space occupied by an electric field it would experience a force equal to the electric field times the magnitude of the charge.

Electric fields can be represented mathematically as vector quantities indicating their magnitude and direction at a specific point or in a given region of space. As light, an electromagnetic wave, propagates, the behavior of the electric field in space and time is determined by Maxwell's equations, which are a set of equations defined by James Clerk Maxwell which constitute the physical laws of electromagnetism. Maxwell's equations have solutions for travelling waves where the electric field varies along an axis, in a circular or elliptical manner, or in random manner.

The orientation of the electric field vector and how it changes with time is known as the state of polarization of the electromagnetic wave or just simply the polarization of the light. If the electric field is confined to a single axis it is said to be linearly polarized. Since the electric field at any given moment is confined to a plane parallel to the direction of propagation and a plane is two dimensional, there are only two possible independent polarization states for light: horizontal and vertical. Although these two unique polarization states used are sometimes referred to as right and left circular polarization, these states are simply combinations of vertical and horizontal states that vary in time in the right way to represent an electric field that rotates in a circular clockwise manner or counterclockwise as the wave propagates. The specific time relationship between the vertical and horizontal states is called a phase relationship.

If the electric field is not confined to a single axis in the plane but has an equal probability of being in the horizontal or vertical direction and there is no specific phase relationship between the vertical and horizontal electric fields, the light is said to be unpolarized or randomly polarized.

The electric field can be polarized and confined to an axis that makes and angle, $\theta$, with say the horizontal axis. Since the electric field is a vector quantity when it is polarized in this manner, it can be broken up into horizontal and vertical components according to the laws of trigonometry. Typically and for the purposes of the present invention, the horizontal component of the electric field, E, is denoted as $E \cos \theta$, and the vertical component of the electric field is denoted as $E \sin \theta$.

Some materials act as polarizers. If randomly polarized (unpolarized) light enters into a slab of finite thickness of polarizing material with the material's polarization oriented say in the vertical direction, the horizontally polarized portion of the incident light is absorbed and the vertically polarized portion is allowed to pass through the material. The result is that the light emanating out of the polarizing material is polarized in the vertical direction, whereby the polarizing materials polarize light.

One can think of polarizers as having a transmission axis or sense and an absorption axis or sense. If linearly polarized light oriented in the vertical direction enters a linear polarizer whose absorption sense is oriented in the vertical direction the light will be absorbed. Equivalently, if linearly polarized light is projected onto a polarizer whose absorption sense is equal to the polarization sense of the light, the light is absorbed. If linearly polarized light is projected onto a polarizer whose absorption sense is orthogonal to the polarization sense of the light the light is transmitted.

The same statements of what happens physically can be made using reference to the transmission sense of the polarizer. For instance, if linearly polarized light is projected onto a polarizer whose transmission sense is equal to the polarization sense of the light, the light is transmitted. If linearly polarized light is projected onto a polarizer whose transmission sense is orthogonal to the polarization sense of the light, the light is absorbed.

Circular polarizers have an absorption sense as well as a transmission sense. The above reasoning carries through for circular polarizers and circularly polarized light. For instance, if circularly polarized light is projected onto a circular polarizer with an absorption sense equal to the polarization sense of the light, the light is absorbed. If the absorption sense of a circular polarizer is left, left circularly polarized light is absorbed when projected onto the polarizer etc.

The following scientific facts lay out the relationship between linear polarization (of light or materials), circular polarization (of light or materials), and light that is unpolarized:

(1) Unpolarized light can be represented as an equal mixture of horizontal linearly polarized light and vertical linearly polarized light, where the phase relationship between the vertical and horizontal linearly polarized states is random;

(2) Unpolarized light can also be represented as an equal mixture of right circularly polarized light and left circularly polarized light, where the phase relationship between the right and left circularly polarized states is random;

(3) Linearly (horizontal or vertical) polarized light can be represented as a linear combination of right and left circularly polarized light, where the phase relationships between the right and left circularly polarized states is specific; and (4) Circularly (right or left) polarized light can be represented as a linear combination of horizontal and vertical linearly polarized light, where the phase relationship between the horizontal and vertical linearly polarized states is specific.

The above facts may be derived from Maxwell's equations or from the quantum mechanical theory of light. Both produce the same results. Further, the above facts have been tested and verified over a long period of time and are accepted as scientific facts.

For the purposes of present invention, we can think of the linearly polarized light as an equal amount of right and left circularly polarized light, and the circularly polarized light as an equal amount of horizontal and vertical linearly polarized light. If circularly polarized light is projected onto a linear polarizer the part of the light that has a polarization sense equal to the transmission sense of the polarizer is transmitted and the other part has a polarization sense equal to the absorption sense of the polarizer and is absorbed. The same holds for linearly polarized light projected on to a circular polarizer. The interrelationships between linearly and circularly polarized light and linear and circular polarizers relate to present invention.

Some linear polarizers are composed of metal crystals aligned along a specific direction. These are also called metal polarizers. Metal polarizers do not have an absorption sense but have instead a reflection sense. The orthogonal sense to their reflection sense is their transmission sense. Metal polarizers relate to some aspects of this invention. The making of sheet polarizers, polarizing material on large sheets of substrates, was pioneered by Edwin H. Land and more by John F. Dreyer. The polarizing layer on these substrates is called a dichroic layer. The phenomena of polarizers and polarizing sheets relate to present invention.

There are techniques of depositing thin layers of metal, metal oxides, or conducting polymer materials onto substrates. These layers do not polarize light but they act as partial reflectors. They reflect only part of the light that is shined upon them. When one looks at one of these layers on a clear substrate one can see objects on the other side and one can also see one's reflection. As the thickness of these layers is increased the reflective property increases and the transparent property decreases. The phenomena of partial reflection relates to this invention.

Polarizing layers and partially reflective layers can be combined as parallel elements onto substrates to produce laminates that can be used for various purposes. Various prior art techniques have been developed to produce such combinations of parallel elements for various purposes. See U.S. Pat. No. 2,776, 598 to Dreyer, U.S. Pat. Nos. 2,788,707 and 2,997,390 to Land, U.S. Pat. No. 4,025,688 to Nagy et al., U.S. Pat. No. 5,347,644 to Sedlmayr et al., and U.S. Pat. No. 3,248,165 to Marks, et al.

Other materials are largely transmissive, i.e., their reflecting qualities are minimal. That is to say that when one shines light on them, the majority of it goes through then without being reflected or absorbed. Transparent and transmissive materials relate to present invention.

Other materials are partially transparent and diffusive. Diffusive materials are able to scatter light in many directions. Intrinsically, this diffusive quality is due to natural perturbations in the index of refraction. Extrinsically the diffusive quality is due to pores, grain boundary defects, strain fields, small quantities of particulate matter, and crystallographic defects. Optical materials are generally made to minimize the diffusive quality, but some of the embodiments of the present invention actually utilizes the partial diffusiveness. Some of the representative materials may have a partial diffusiveness include; alkali and alkaline earth halides such as chlorides, bromides, iodes, $B_aF_2$, $P_bF_2$; oxides such as $Al_2O_3$; oxynitrides such as ALON; chalcogenides such as ZnSe and ZnS; and semiconductors such as Si, Ge, and Go,As. The extrinsic diffusiveness can be adjusted depending on how the materials are made.

SUMMARY OF THE INVENTION

In accordance with the present invention, a novel system and method for display and/or viewing images in enhanced apparent depth is disclosed. More particularly, the present invention utilizes the characteristics of polarizing layer (lens) and magnifying lens (layer) to achieve the enhanced apparent depth of the images being viewed. Preferably, Fresnel lens (layer), or the optical analog of Fresnel lens such as lenticular lens, is used as the magnifying lens.

For purposes of this invention, the terms "Fresnel lens," "Fresnel lens layer," or "Fresnel layer" refer a piece of optical material with concentric circular ridges/grooves carved into it as shown in FIG. 2, or devices or mechanisms that have the functional characteristics of a Fresnel lens. Furthermore, the words "layer" and "lens" are used interchangeably for purpose of the present invention.

One way to explain a first aspect of the invention is by a way of analogy to the shading used by painters. If one draws a circle on a page, it would look two dimensional. However, if one shades the edge of the circle, the human brain may be fooled into thinking that it can see past the circle and the circle begins to look like a ball, whereby a two dimensional object begins to appear three dimensional. The polarizing layer in the present invention, makes the boundary lines between objects in a scene transparent. Thus, the polarizing layer produces the two dimensional images on the screen with a type of "optical shading." The human brain thinks that it can see past the boundary of each object, because it can literally see past the boundary as the boundary lines are transparent, thus the boundaries are shaded and the objects appear with enhanced depth. That is, the apparent shading by the polarizing layer makes the brain paint the objects in apparent three dimensions in its subjective psychological visual space. This "optical shading" makes the objects in the background of the scene seem back further with respect to the foreground.

A second aspect of the invention pertains to one of the effects of the Fresnel lens or layer. The Fresnel lens provides apparent magnification. The magnification increases as the parameter, d (FIG. 3), increases. The magnification makes the foreground objects seem closer. This makes the background seem still further away. Thus, the enhancement of the apparent depth is achieved by making the background seem farther away and the foreground seem closer.

A third aspect of the theory of the invention is the function of the Fresnel lens. The Fresnel lens shows different image points of the same object point for different colors (wavelengths) of light. This increases the apparent optical surface area. This characteristic, when combined with a polarizer, increases the apparent three dimensional qualities of the image, as described in U.S. patent application Ser. No. 08/856,451 to Douglas Burke. This increase in the number of image points for a given object point gets larger the smaller the parameter, b, gets. The parameter, b, is the spacing between the grooves and is shown in FIG. 4. If the parameter gets too far below the wavelength of the light the effect may be lost.

A fourth aspect of the proposed invention comprises the effects of diffraction, the parameter, b, can be made to be on the order of a wavelength of light. Each groove can be divided into a family of grooves each of which whose value for, b. The values of b can be set to be equal to the conditions required for diffraction for each of those wavelengths. This separates the colors into different diffraction patterns locally, in turn, repackages the light into local diffract-run patterns. The repackaging of the light increases the amount of order, pattern, and information in the image which the brain interprets as depth.

The novelty of the combination of the present invention is derived from the combinational use polarizer and the Fresnel lens, wherein the polarizer makes the background seem further away due to optical shading, and the Fresnel lens creates the illusion that the foreground is closer. Since these two achieve their effects in different ways, the effects do not cancel each other out. However, it is generally understood in the art that if one uses an optical element to make the object seem farther away and another optical element for magnification, the two effects will cancel each other out when the two elements are combined. The present invention makes the inventive step of achieving enhanced depth between foreground and background by using a polarizer and a Fresnel lens, whereby their effects can exist simultaneously, without canceling each other out.

Therefore, the systems described above allow the displaying and/or viewing of any image with enhanced apparent depth.

DETAILED DESCRIPTION OF THE INVENTION

Figure 1:
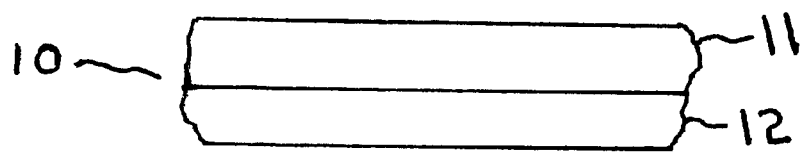
FIG. 1 is a cross sectional view of an embodiment of a screen in accordance with the present invention having a polarizing layer and a magnifying layer.
Figure 2:
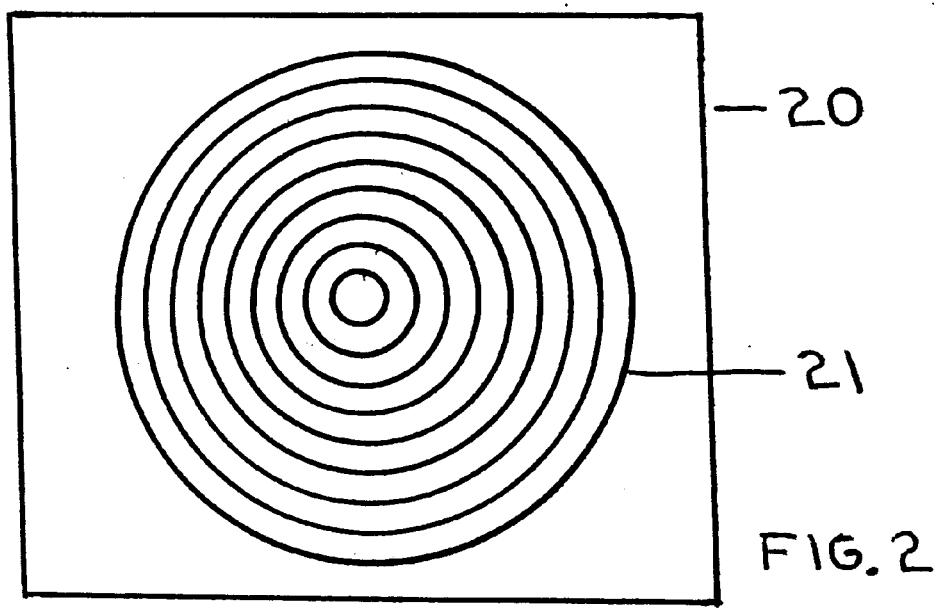
FIG. 2 is a perspective view of concentric grooves in a Fresnel lens.
Figure 4:
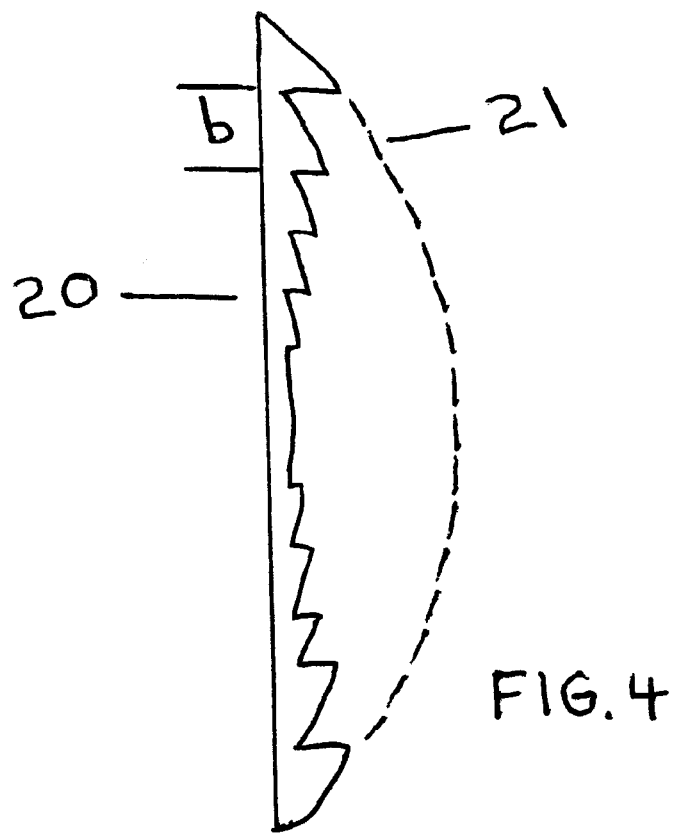
FIG. 4 is a cross sectional view of a Fresnel layer with curved segments.
Figure 5:
FIG. 5 is a cross sectional view of a Fresnel lens with flat segments.

In accordance with one embodiment of the present invention, a perspective view of a screen (10) is shown in FIG. 1 which comprises a polarizing layer (11) and a magnifying layer (12). The magnifying layer is, preferably, a Fresnel lens or layer. The Fresnel lens or layer may be a piece of clear optical material such as glass or plexiglass with concentric circular ridges carved into it as shown in FIG. 2. A cross sectional view of the ridges in a Fresnel lens are shown in FIGS. 4 and 5.

Figure 3A:
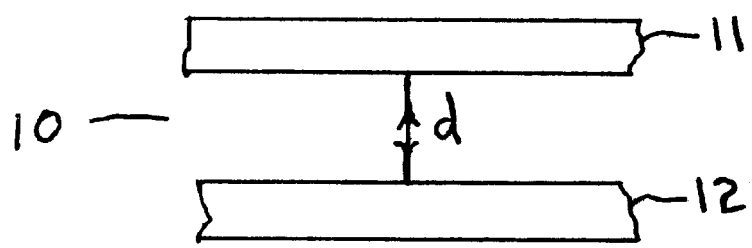
FIG. 3A is a perspective view of an embodiment of a screen having two layered screen with a separation between layers in accordance with the present application.
Figure 3B:
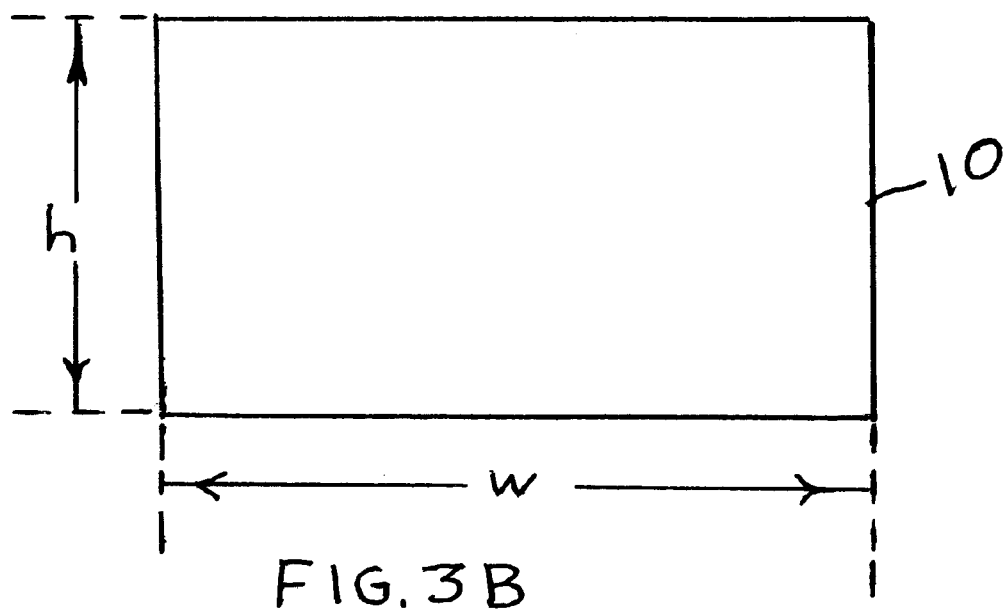
FIG. 3B is a perspective view of a screen having a width and a height.

In accordance with another embodiment of the proposed invention, a screen (10) comprising a polarizing layer (11) and a magnifying layer (12), separated by a distance, d is shown in FIG. 3A. Preferably, the polarizing layer is a dichroic layer and magnifying layer is a Fresnel layer. The distance d is less than the width or height of the screen as shown in FIG. 3B and larger than zero. Preferably, d is one fourth the height (h) of the screen and not larger than the focal length of the lens.

Figure 6:
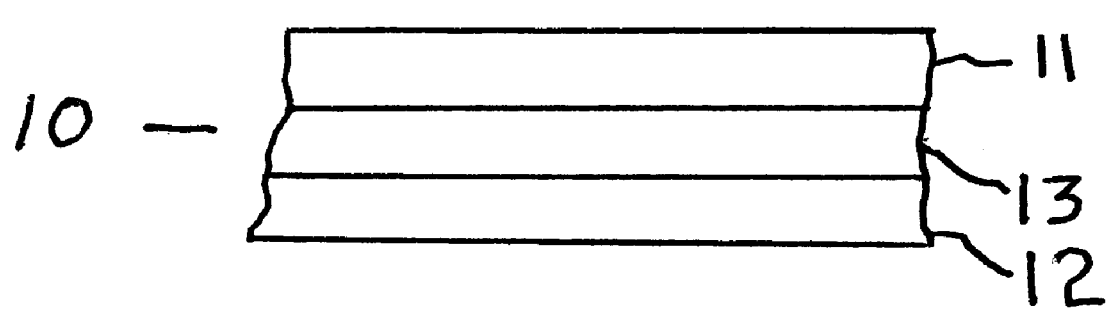
FIG. 6 is a cross sectional view of an embodiment of a screen having a three layered screen having a polarizing layer, polarization scattering layer, and magnifying layer in accordance with the present invention.

Yet, another embodiment of the present invention comprises a polarizing layer (11), a magnifying layer (12), and a polarization scattering layer (13) as shown in FIG. 6. The polarization scattering layer (13) may be of any material which scatters the polarization state of the incoming light. Preferably, the polarization scattering layer (13) is a quarter wave retarder layer. This means that, if light of an initial polarization enters the material and moves through it, it has become a mixture of polarization states upon exiting the material.

Figure 7:
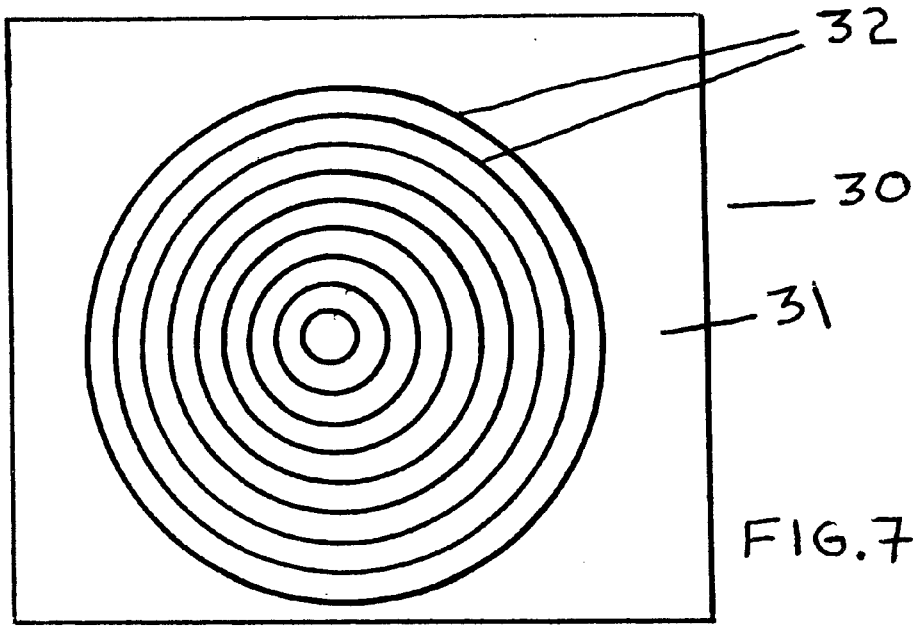
FIG. 7 is a perspective view of an embodiment of an one layer screen in accordance with the present invention, which is a polarizing layer having concentric circles carved onto it.

Yet, another embodiment of the present invention comprises a polarizing layer (31) with concentric circles (32) carved into it as shown in FIG. 7. The concentric circles on the layer has the functional characteristics of the Fresnel lens, and hence, this embodiment combines the polarizer and Fresnel lens into a single optical piece.

Figure 8:
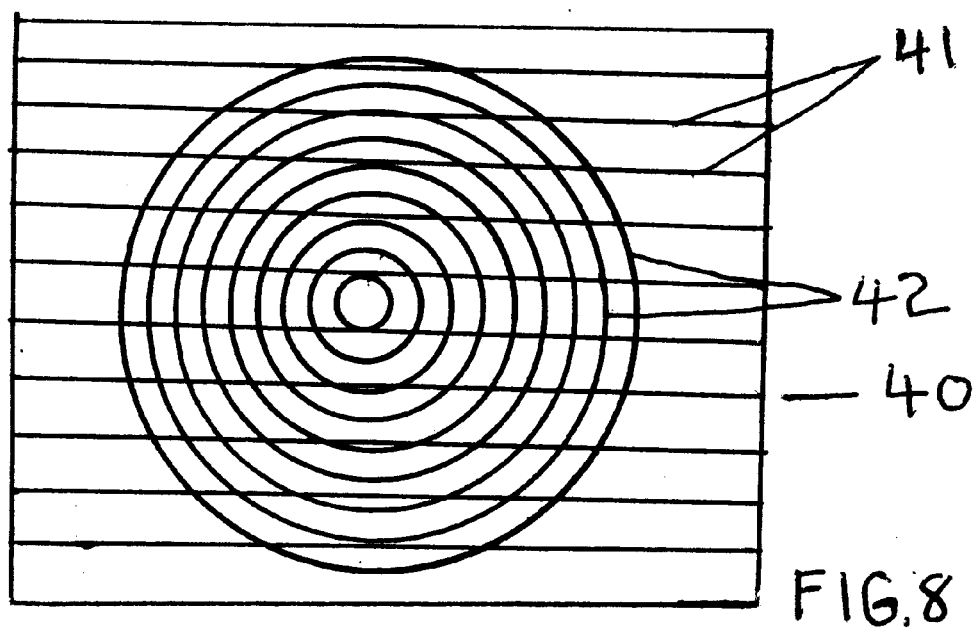
FIG. 8 is a perspective view of an embodiment of one layer screen a Fresnel layer having a polarizing material deposited onto it in accordance with the present invention.

Yet, another embodiment of the present invention comprises a Fresnel layer (42) with polarizing material (41) deposited on it as shown in FIG. 8. This configuration allows the Fresnel layer to act as the optical substrate to hold the polarizer. It eliminates the need for a second substrate (layer), making the manufacturing easier and less costly. Preferably, the polarizing material is dichroic dye.

Figure 9:
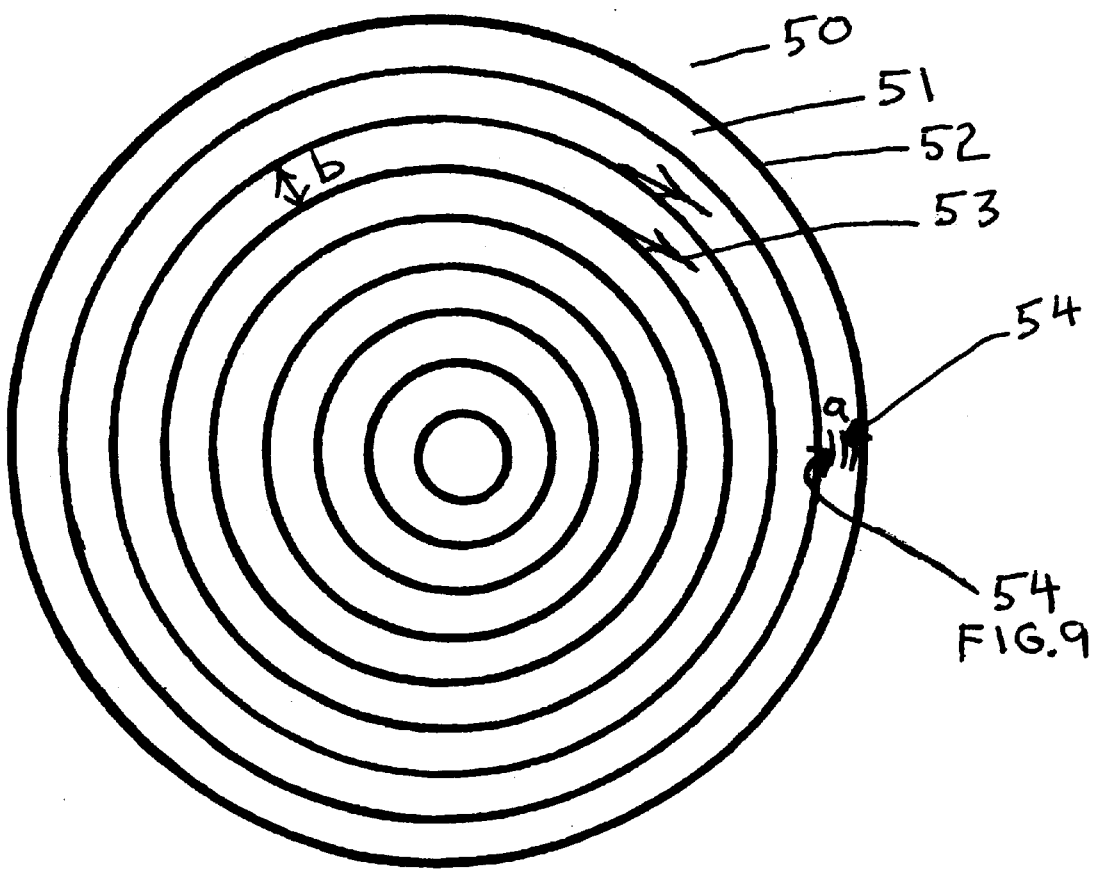
FIG. 9 is a perspective view of an embodiment of an one layer screen having a transparent substrate having a polarization material deposited onto it in a concentric circular pattern in accordance with the present invention.
Figure 9A:
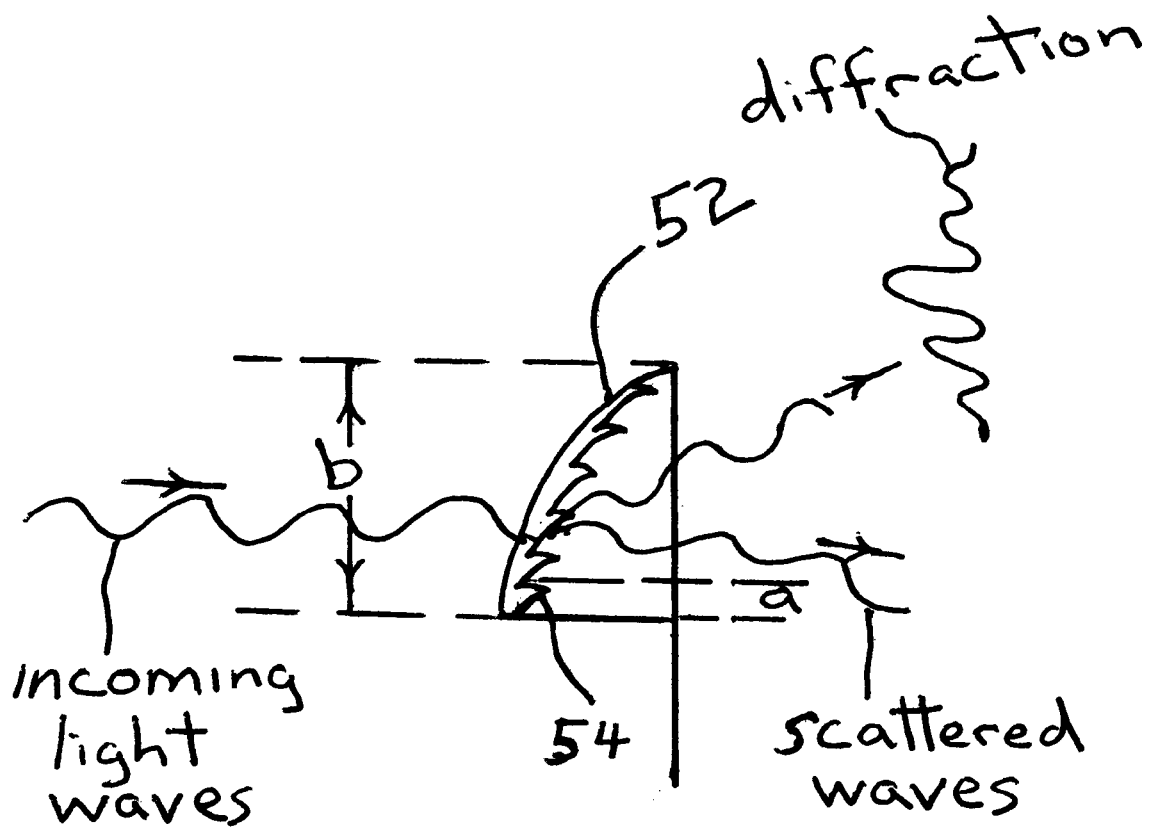
FIG. 9A is a detailed schematic view of FIG. 9, showing the scattering and diffracting of light facilitated by grooves and subgrooves of a Fresnel layer.

Yet, another embodiment of the proposed invention comprises a transparent substrate (51) on which polarizing material (52) is deposited as shown in FIG. 9. The polarization sense (53) of the material preferably forms a pattern of concentric circles (52) on the substrate (51). This means that, if one were to draw imaginary concentric circles (52) on the substrate (51), the polarization sense (53) of the material would be everywhere tangent (53) to those circles (52). To achieve this effect, one may first place dichroic dye in the melt onto the substrate. Then a large spinning circular brush may press the dye on the substrate. The diameter of the brush preferably is at least as large as the substrate to be coated. The bristles on the brush preferably are as fine as possible, since their force aligns the molecules of dye. After the brush aligns the molecules in concentric circles, the dye is allowed to freeze and harden with the polarization geometry permanently configured in concentric circles. This technique of aligning molecules by brush, to get a polarizer from dichroic dye is well known is the art. See U.S. Pat. Nos. 2,788,707 and 22 2,997,390. If one simply applies Dreyer's techniques with a spinning brush to a substrate, the polarizing material will be aligned tangent to concentric circles centered at the axis of rotation of where the brush was pressed into the substrate. If the spinning brush is pressed in harder on the outer bristles and less hard as one moves towards the bristles in the center, the grooves will be more pronounced the further one is from the center. The grooves will look like those in FIGS. 4 and 5, whereby the pattern forming a Fresnel lens.

Figure 10:
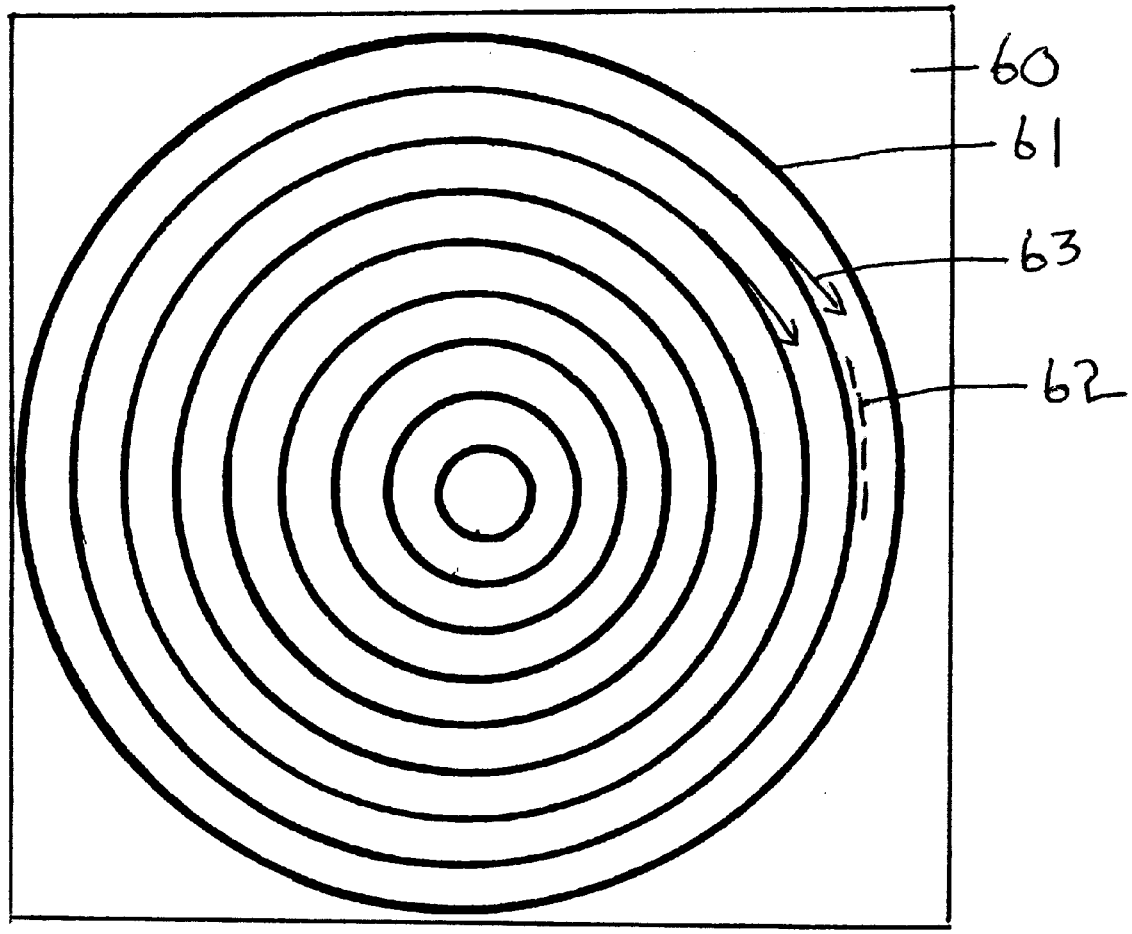
FIG. 10 is a perspective view of an embodiment of an one layer screen having a Fresnel layer with a polarization material deposited onto it in a concentric circular pattern in accordance with the present invention.

Another embodiment of the proposed invention comprises a Fresnel lens (60) having a polarizing material (61) deposited on it, wherein the polarizing molecules in the polarizing material have their polarization sense (63) aligned tangent to the concentric grooves (62) of the Fresnel lens as shown is FIG. 10.

The concentric circles (grooves) that make up a Fresnel lens may have curvature or are flat. The cross section of a Fresnel lens with curved segments is shown in FIG. 4. The cross section of a Fresnel lens with flat segments is shown in FIG. 5. Optimum conditions for the Fresnel lens lie in the spacing between adjacent grooves. In FIG. 4 the distance, b, is the distance between grooves. If b is on the order of the wavelength of the incoming light optimum conditions occur. Preferably, the order of the wavelength of the incoming light is between 0.1 and 10 microns. Furthermore preferably, each groove is subdivided into several grooves each with a width of 0.2, 0.3, 0.4 . . . 0.8 microns, encompassing the wavelengths of the different colors. Grooves of these dimensions may be cut into the lens using a modem laser cutting tool such as the tool that cuts the grooves into a compact disc. If these dimensions are not economically attainable by cutting, the polarizer described in this embodiment may have concentric circles spaced apart by dimensions of the size of the molecules which can be on the order of the size of optical wavelengths.

In another embodiment of the present invention, the polarizing layer may be a dichroic layer with each molecule in the layer having a random polarization sense. In this instance the light carrying the image would have to be unpolarized or circularly polarized in order that a portion of it be stopped and seen on the screen. The dichroic layer preferably has localized regions with a polarization sense.

In another embodiment of the present invention, the polarizer may further comprise a bead layer and or a partially reflective layer as shown in Figures. The optimum conditions and geometry of the bead layer is described in U.S. patent application Ser. No. 08/856,451 and U.S. patent application Ser. No. 09/322,701, to Douglas Burke, herein incorporated by reference.

Figure 11A:
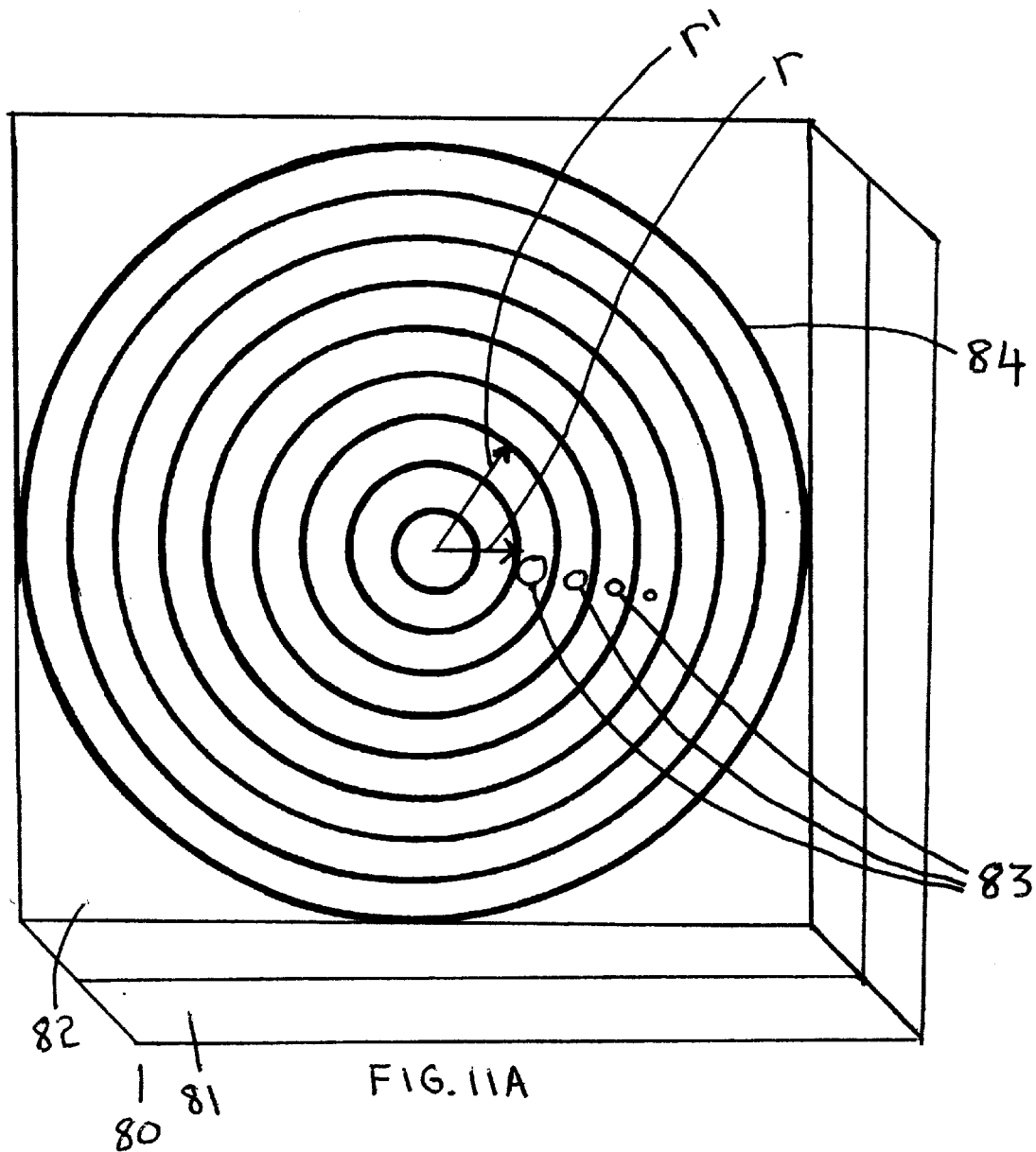
FIG. 11A is a perspective view of a bead layer and a polarizing layer with beads placed in a concentric circular pattern wherein the size of the beads gets progressively larger towards the center of the layer in accordance with the present invention.

Yet, another embodiment of the present invention is the same as those with a polarizing layer (90) and a Fresnel lens, except the Fresnel lens is replaced with a specifically ordered bead layer (80), wherein the beads (83) are arranged in concentric circles (82) as shown in FIG. 11A. Beads of equal diameter are positioned at equal radii (r) from the center (81) of the screen (70). Beads on the outer circles have a smaller diameter than those on the inner circles. The beads (83) get progressively larger as they approach the center (81) of the screen (70). The diameter of the beads range from 0.1–100 microns. This configuration allows the concentrically ordered bead layer acts as a Fresnel lens.

Figure 11B:
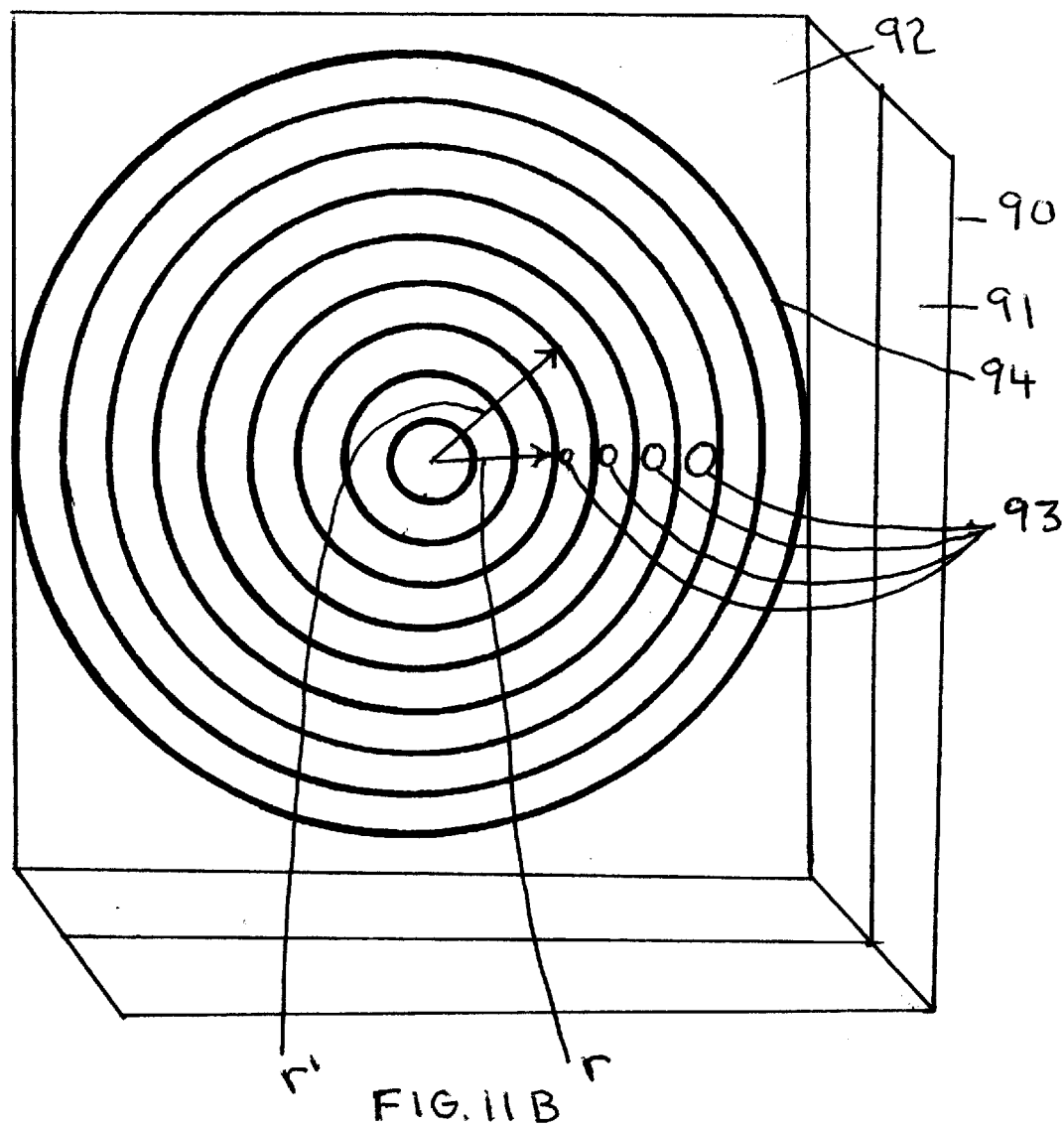
FIG. 11B is a perspective view of a bead layer and a Fresnel layer with beads placed in a concentric circular pattern wherein the size of the bead gets progressively smaller toward the center of the layer in accordance with the present invention.

Yet, another embodiment of the present invention comprises a concentrically ordered bead layer (80) and a Fresnel lens (100) as shown in FIG. 11B. The beads (83) are arranged in such a way that the largest beads (beads with largest diameter) are positioned in the outer most circle of the bead layer, and the size of the beads gets progressively smaller towards the center (81) circle of the bead layer. The bead layer makes (80) the image look farther away, and the Fresnel lens (100) makes the image look closer. The two effects do not cancel each other and, as a result, the depth is enhanced.

Figure 12:
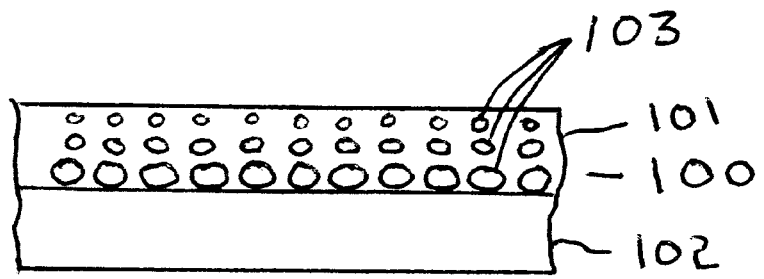
FIG. 12 is a cross-sectional view of an embodiment of an two layer screen having a Fresnel layer and a specifically ordered bead layer having a multiplicity of bead sublayers in accordance with the present invention.

Yet, another embodiment of the present invention comprises another type of a specifically ordered bead layer (101) having a multiplicity of bead sublayers and a Fresnel lens (102) as shown in FIG. 12. The bead layer (101) comprises a multiplicity of beads sublayers (103), each sublayer having a different diverse bead diameter. The beads arranged in such a way that the larger beads are positioned closer to the Fresnel lens (102). Preferably, the diameter of the beads range from 0.1 to 100 microns. In this embodiment, the bead layer (101) makes the image look farther away. This is because each bead (103) functions as a lens, whereby looking through the beads with the large beads closer to the eye is like looking through a telescope backwards. This happens locally at the microstructural level. The Fresnel lens (102) magnifies globally throughout the screen because of macrostructure. The two effects coexist and the depth is enhanced.

Figure 13:
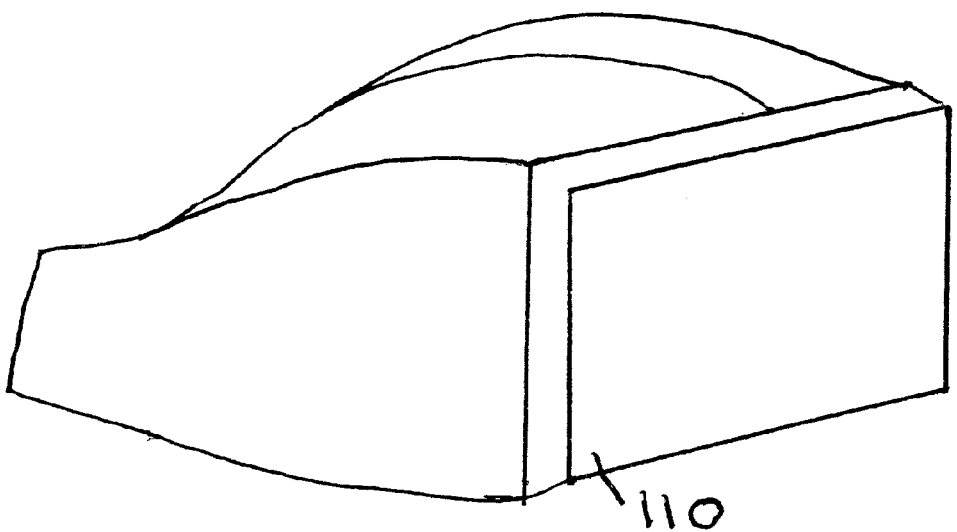
FIG. 13 is a general perspective view of a monitor screen which is a preferred embodiment of a screen in accordance with the present invention.

In a preferred embodiment, the system described above may be used as a screen as shown in FIG. 13. The screen (110) may be adapted to be placed over a television screen, computer monitor, and any display mechanism such that a viewer can watch with an enhanced apparent depth.

Figure 14:
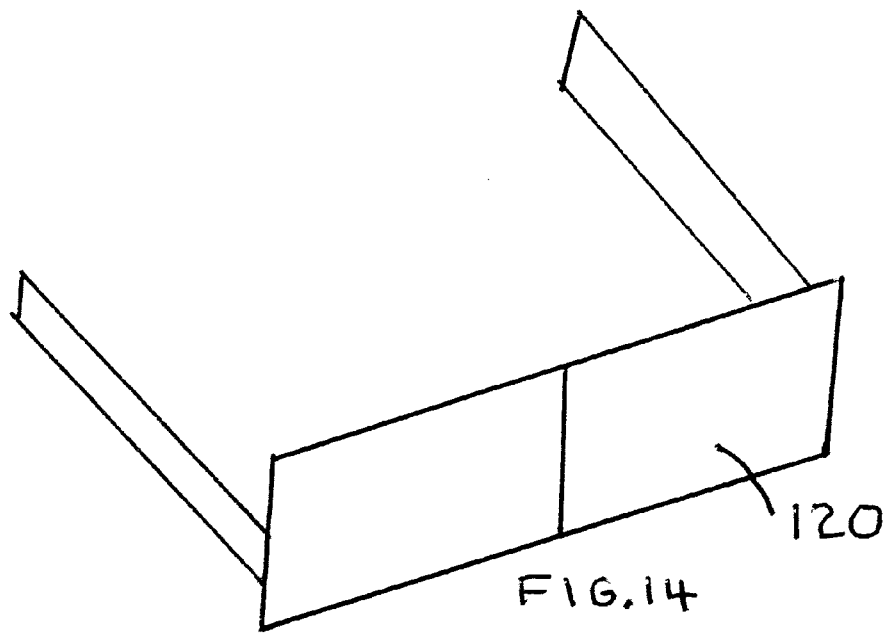
FIG. 14 is a general perspective view of an eyewear which is an embodiment of a screen in accordance with the present invention.

In another embodiment, the system described above may be used as an eyewear as shown in FIG. 14 to watch any images such as movies and television with enhances apparent depth. Under this application, the television screen or the movie screen in the theater constitute a projected images source which is, in turn, projected onto the eyewear screen system.

While the description above has been particularly shown and described with reference to preferred embodiments thereof, it will be understood that those skilled in the art that various changes in form and detail can be made without departing from the spirit and scope of this invention.

I claim:

1. A refractive device placed along an optical axis drawn between an ordinary two-dimensional image and a viewer's eyes to provide an illusion of relief or an illusory three-dimensional picture of a single perspective comprising in order of their arrangement along the optical axis: an object-side end of the device facing the two-dimensional image; at least one polarizing layer having a preferred polarization sense; at least one magnifying layer; and a imaging-side end of the device facing the viewer's eyes; where at least some light incident on the object-side end of the device from the two-dimensional image has a preferred polarization sense orthogonal to the preferred polarization sense of the at least one polarizing layer.

2. The device of claim 1 where the device has a height; the at least one magnifying layer has a focal length; and where the at least one polarizing layer and the at least one magnifying layer are separated along the optical axis by a distance d>0 that is less than the height of the device and less than the focal length of the at least one magnifying layer.

3. The device of claim 2 where the at least one magnifying layer is a Fresnel layer.

4. The device of claim 3 where the Fresnel layer comprises a plurality of concentric grooves; and where each individual groove in the plurality of concentric grooves has a width b satisfying the conditional expression $0.1 \times 10^{-6}$ m$<$b$<10 \times 10^{-6}$ m.

5. The device of claim 4 where each individual groove in the plurality of concentric grooves comprises a plurality of subgrooves; and each individual subgroove in the plurality of subgrooves has a width w satisfying the conditional expression $300 \times 10^{-9}$ m$<$w$<1000 \times 10^{-9}$ m.

6. The device of claim 5 where the Fresnel layer comprises material having an index of refraction n; where each individual subgroove in the plurality of subgrooves has a width w satisfying the conditional expression $(0.3/n) \times 10^{-6}$ m$<$w$<(1/n) \times 10^{-6}$ m.

7. The device of claim 1 where the at least one polarizing layer includes a dichroic-type polarizing material.

8. The device of claim 1 comprising a second polarizing layer; where the second polarizing layer is disposed along the optical axis between the at least one magnifying layer and the imaging-side end of the device; where a portion of the second polarizing layer has a preferred polarization sense parallel to the preferred polarization sense of the at least one polarizing layer; and where the at least one polarizing layer and second polarizing layer are each separated from the at least one magnifying layer by a distance g>0 along the optical axis of the device.

9. The device of claim 1 comprising a layer of material capable of converting incident light having a single polarization state into light having a mixture of two polarization states.

10. The device of claim 1 comprising a polarization scattering layer disposed along the axis device between the at least one polarizing layer and the at least one magnifying layer.

11. The device of claim 10, where the polarization scattering layer is a quarter-wavelength optical phase retarder.

12. The device of claim 1 where the device is a screen adapted to be placed over viewing area of a two-dimensional image display.

13. A refractive device placed along an optical axis drawn between an ordinary two-dimensional image and a viewer's eyes to provide an illusion of relief or an illusory three-dimensional picture of a single perspective comprising in order of their arrangement along the optical axis: an object-side end of the device facing the two-dimensional image; at least one polarizing layer having a preferred olarization sense; at least one Fresnel layer; and a imaging-side end of the device facing the viewer's eyes; where the device has a height; the at least one Fresnel layer has a focal length; the at least one polarizing layer and the at least one Fresnel layer are separated along the optical axis by a distance d>0 that is less than the height of the device and less than the focal length of the at least one magnifying layer; and where at least some light incident on the object-side end of the device from the two-dimensional image has a preferred polarization sense orthogonal to the preferred polarization sense of the at least one polarizing layer.

14. A refractive device placed along an optical axis drawn between an ordinary two-dimensional image and a viewer's eyes to provide an illusion of relief or an illusory three-dimensional picture of a single perspective comprising in order of their arrangement along the optical axis: an object-side end of the device facing the two-dimensional image; a polarizing layer having a preferred polarization sense; and a imaging-side end of the device facing the viewer's eyes; and where a pattern comprising a plurality of concentric circles arranged in the geometry of a Fresnel lens is provided in relief on a surface of the polarizing layer facing the imaging-side end of the device.

15. A refractive device placed along an optical axis drawn between an ordinary two-dimensional image and a viewer's eyes to provide an illusion of relief or an illusory three-dimensional picture of a single perspective comprising in order of their arrangement along the optical axis: an object-side end of the device facing the two-dimensional image; a magnifying layer; and a imaging-side end of the device facing the viewer's eyes; where polarizing material is disposed on a surface of the magnifying layer.

16. The device of claim 15 where a plurality of concentric circular grooves is provided in relief on a surface of the magnifying layer; and where the polarizing material disposed on the surface of the magnifying layer has a preferred polarization sense oriented in a direction tangent to the circular pattern of the grooves at each point on the surface of the magnifying layer.

17. The device of claim 16 where the polarizing material comprises polarizable molecules preferentially aligned such that the preferred polarization sense of the material is tangent to the circular pattern of the grooves at each point on the surface of the magnifying layer.

18. A refractive device placed along an optical axis drawn between an ordinary two-dimensional image and a viewer's eyes to provide an illusion of relief or an illusory three-dimensional picture of a single perspective comprising in order of their arrangement along the optical axis: an object-side end of the device facing the two-dimensional image; a transparent substrate; and a imaging-side end of the device facing the viewer's eyes; where polarizing material is disposed on a surface of the substrate such that the preferred polarization sense of the material forms a pattern of concentric circles arranged in the geometry of a Fresnel on the surface of the substrate.

19. A refractive device placed along an optical axis drawn between an ordinary two-dimensional image and a viewer's eyes to provide an illusion of relief or an illusory three-dimensional picture of a single perspective comprising in order of their arrangement along the optical axis: an object-side end of the device facing the two-dimensional image; a polarizing layer; a Fresnel layer comprising a plurality of beads arranged in a pattern of concentric circles substantially covering the polarizing layer; and a imaging-side end of the device facing the viewer's eyes.

20. A refractive device placed along an optical axis drawn between an ordinary two-dimensional image and a viewer's eyes to provide an illusion of relief or an illusory three-dimensional picture of a single perspective comprising in order of their arrangement along the optical axis: an object-side end of the device facing the two-dimensional image; a first layer having a surface; a second layer substantially covering the surface of the first layer; and a imaging-side end of the device facing the viewer's eyes; where the first layer is a polarizing layer and the second layer is a lens with magnification greater than zero.

21. A refractive device placed along an optical axis drawn between an ordinary two-dimensional image and a viewer's eyes to provide an illusion of relief or an illusory three-dimensional picture of a single perspective comprising in order of their arrangement along the optical axis: an object-side end of the device facing the two-dimensional image; a first layer having a surface; a second layer substantially covering the surface of the first layer; and a imaging-side end of the device facing the viewer's eyes; where the first layer is a polarizing layer and has a preferred polarization sense; the second layer comprising an arrangement of a plurality of beads disposed in a pattern of concentric circles arranged in the geometry of a Fresnel lens; where each of the beads has a diameter; and where the beads are arranged by diameter from the smallest to the largest from the innermost to the outermost concentric circles, respectively.

22. The device of claim 21 where the bead diameters are between $0.1 \times 10^{-6}$ m and $100 \times 10^{-6}$ m.

23. The device of claim 21 where the Fresnel layer and the bead layer are separated along the optical axis by a distance d>0.

24. A refractive device placed along an optical axis drawn between an ordinary two-dimensional image and a viewer's eyes to provide an illusion of relief or an illusory three-dimensional picture of a single perspective comprising in order of their arrangement along the optical axis: an object-side end of the device facing the two-dimensional image; a Fresnel layer; a concentrically ordered bead layer substantially covering the Fresnel layer; and a imaging-side end of the device facing the viewer's eyes; where the bead layer includes a plurality of beads, each of the beads having a diameter; and where the beads are arranged by diameter from the smallest to the largest from the inner circle of the concentric order to the outer circle of the concentric order, respectively.

25. The device of claim 24 where the bead diameters are between $0.1 \times 10^{-6}$ m and $100 \times 10^{-6}$ m.

26. The device of claim 24 where the Fresnel layer and the bead layer are separated along the optical axis by a distance d>0.

27. A refractive device placed along an optical axis drawn between an ordinary two-dimensional image and a viewer's eyes to provide an illusion of relief or an illusory three-dimensional picture of a single perspective comprising in order of their arrangement along the optical axis: an object-side end of the device facing the two-dimensional image; a Fresnel layer; a bead layer comprising a plurality of bead sublayers where each of the sublayers has a different average bead diameter, where the average bead diameter is arranged from smallest to largest from the beginning of the bead layer to the end of the bead layer, respectively; and a imaging-side end of the device facing the viewer's eyes.

28. The device of claim 27 where the bead diameters are between $0.1 \times 10^{-6}$ m and $100 \times 10^{-6}$ m.

29. The device of claim 27 where the bead diameters are between $0.1 \times 10^{-6}$ m and $2 \times 10^{-6}$ m.

30. The device of claim 27 where the Fresnel layer and the bead layer are separated along the optical axis by a distance d>0.

31. The device of claim 27 wherein the Fresnel layer is absent.

32. The device of claim 31 where the bead diameters are between $0.1 \times 10^{-6}$ m and $100 \times 10^{-6}$ m.

33. The device of claim 31 where the bead diameters are between $0.1 \times 10^{-6}$ m and $2 \times 10^{-6}$ m.

34. The device of claim 27 wherein the Fresnel layer is absent and said device is used as a projection screen onto which images are projected and viewed.

* * * * *